(12) United States Patent
Dalsgaard et al.

(10) Patent No.: US 10,257,732 B2
(45) Date of Patent: Apr. 9, 2019

(54) DELIVERY OF MEASUREMENTS (71) Applicant: Nokia Technologies Oy, Espoo (FI)

(72) Inventors: Lars Dalsgaard, Oulu (FI); Jorma Kaikkonen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/766,653

(22) PCT Filed: Mar. 1, 2013

(86) PCT No.: PCT/US2013/028707
§ 371 (c)(1),
(2) Date: Aug. 7, 2015

(87) PCT Pub. No.: WO2014/133551
PCT Pub. Date: Sep. 4, 2014

(65) Prior Publication Data
US 2015/0382221 A1    Dec. 31, 2015

(51) Int. Cl.
*H04B 17/00* (2015.01)
*H04W 24/10* (2009.01)
(Continued)

(52) U.S. Cl.
CPC ........... *H04W 24/10* (2013.01); *H04W 24/08* (2013.01); *H04W 36/30* (2013.01);
(Continued)

(58) Field of Classification Search
None
See application file for complete search history.

(56) References Cited

U.S. PATENT DOCUMENTS

2010/0317347 A1* 12/2010 Burbidge .......... H04W 36/0088
                                                                455/436
2010/0323710 A1* 12/2010 Chen ................... H04W 74/004
                                                                455/450
(Continued)

FOREIGN PATENT DOCUMENTS

EP         2523495          11/2012
WO    WO-2011101346 A1    8/2011
(Continued)

OTHER PUBLICATIONS

International Search Report and Written Opinion received for corresponding Patent Cooperation Treaty Application No. PCT/US2013/028707 , dated Mar. 5, 2014, 11 pages.
(Continued)

*Primary Examiner* — Sithu Ko
(74) *Attorney, Agent, or Firm* — Mintz Levin Cohn Ferris Glovsky and Popeo, P.C.

(57) ABSTRACT

Methods and apparatus, including computer program products, are provided for measurement delivery. In some example embodiments, there is provided a method. The method may include receiving information to configure a user equipment to perform one or more measurements and to configure the user equipment to report, when requested by a network, the one or more measurements; receiving a request from the network to report the one or more measurements configured based on the received information; and reporting, in response to the request from the network, the one or more measurements to the network, without regard to measurement event reporting. Related apparatus, systems, methods, and articles are also described.

12 Claims, 3 Drawing Sheets

(51) Int. Cl.
*H04W 76/28* (2018.01)
*H04W 24/08* (2009.01)
*H04W 36/30* (2009.01)
*H04W 72/04* (2009.01)
*H04W 84/04* (2009.01)

(52) U.S. Cl.
CPC ......... *H04W 72/042* (2013.01); *H04W 76/28* (2018.02); *H04W 84/045* (2013.01)

(56) References Cited

U.S. PATENT DOCUMENTS

| | | | |
|---|---|---|---|
| 2012/0015681 A1* | 1/2012 | Dalsgaard | H04W 48/08 455/517 |
| 2012/0082052 A1 | 4/2012 | Oteri et al. | |
| 2013/0114554 A1* | 5/2013 | Yang | H04W 24/10 370/329 |
| 2014/0302865 A1* | 10/2014 | Bai | H04W 24/10 455/452.1 |

FOREIGN PATENT DOCUMENTS

| | | |
|---|---|---|
| WO | 2012047070 | 4/2012 |
| WO | 2013025539 | 2/2013 |

OTHER PUBLICATIONS

3GPP, "Technical Specification Group Radio Access Network; Evolved Universal Terrestrial Radio Access (E-UTRA); LTE physical layer; General description (Release 11)," 3rd Generation Partnership Project, 3GPP TS 36.201 V11.1.0, Dec. 2012.

3GPP, "Technical Specification Group Radio Access Network; Evolved Universal Terrestrial Radio Access (E-UTRA); Physical Channels and Modulation (Release 11)," 3GPP Generation Partnership Project, 3GPP TS 36.211 V11.1.0, Dec. 2012.

3GPP, "Technical Specification Group Radio Access Network; Evolved Universal Terrestrial Radio Access (E-UTRA); Multiplexing and channel coding (Release 11)," 3rd Generation Partnership Project, 3GPP TS 36.212 V11.1.0, Dec. 2012.

3GPP, "Technical Specification Group Radio Access Network; Evolved Universal Terrestrial Radio Access (E-UTRA); Physical layer procedures (Release 11)," 3rd Generation Partnership Project, 3GPP TS 36.213 V11.1.0, Dec. 2012.

3GPP, "Technical Specification Group Radio Access Network; Evolved Universal Terrestrial Radio Access (E-UTRA); Physical layer; Measurements (Release 11)," 3rd Generation Partnership Project, 3GPP TS 36.214 V11.1.0, Dec. 2012.

3GPP, "Technical Specification Group Radio Access Network; Evolved Universal Terrestrial Radio Access (E-UTRA); Radio Resource Control (RRC); Protocol specification (Release 11)," 3rd Generation Partnership Project, 3GPP TS 36.331 V11.1.0, Sep. 2012.

* cited by examiner

DELIVERY OF MEASUREMENTS

RELATED APPLICATION

This application was originally filed as PCT Application No. PCT/US2013/028707 filed Mar. 1, 2013.

FIELD

The subject matter disclosed herein relates to wireless communications.

BACKGROUND

The use of heterogeneous networks (hetnets) may provide opportunities for offloading traffic from the macrocells to a typically higher speed or capacity small cell. The heterogeneous network may include one or more wireless access points, or base stations, such as for example an E-UTRAN (evolved Universal Mobile Telecommunications System Terrestrial Radio Access Network) NodeB base station serving macrocells, and one or more small cell base stations serving small cells. For example, a small cell base station (or a wireless access point or a remote radio head) may be implemented to cover a small cell, or coverage area, examples of which include a residence, a small business, a building, an office, or a small area. As such, the small cell base station, such as for example a home base station (HNB), a home E-UTRAN NodeB base station (HeNB), a WiFi access point, and the like, may be configured to have functionality similar to a typical base station, such as for example an E-UTRAN NodeB (eNB) base station, but the small cell base station may have less range and output power given its limited coverage area. For example, the small cell base station may be implemented as a wireless access point/femtocell base station having power sufficient for a cell serving wireless devices within a limited range of about tens of meters. Picocell base stations are another example of a small cell base station, but picocell base stations have somewhat greater range serving a small area on the order of about 100-200 meters. Accordingly, wireless service providers view small cell base stations as a way to extend service coverage and as a way to offload traffic to the small cell base stations, and/or as a way to provide enhanced service, such as for example higher data rates, lower latencies, energy efficiency and the like, within the small cell, when compared to the larger macrocell served by a typical base station, such as for example the eNB base station.

SUMMARY

In some example embodiments, there is provided a method for receiving information to configure a user equipment to perform one or more measurements and to configure the user equipment to report, when requested by a network, the one or more measurements; receiving a request from the network to report the one or more measurements configured based on the received information; and reporting, in response to the request from the network, the one or more measurements to the network, without regard to measurement event reporting.

In some variations, one or more of the featured disclosed herein including one or more of the following features can optionally be included in any feasible combination. The reporting may be performed without the user equipment waiting for the measurement event reporting, including one or more user equipment controlled events A1 through A5, being triggered by the user equipment. The request may include a physical downlink control channel order received at the user equipment or an indication received at the initiation of a mobile originated or a mobile terminated call. When the user equipment is in a discontinuous reception mode, the one or more measurements may be performed in accordance with the received information to enable the user equipment to provide the one or more measurements, when requested by the network. When a call set up establishes synchronization with the network, the one or more measurements may be performed to enable at least one of an offloading or a handover to a cell.

Articles are also described that comprise a tangibly embodied computer-readable medium embodying instructions that, when performed, cause one or more machines (for example, computers, etc.) to result in operations described herein. Similarly, apparatus are also described that can include a processor and a memory coupled to the processor. The memory can include one or more programs that cause the processor to perform one or more of the operations described herein.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

Like labels are used to refer to same or similar items in the drawings.

DETAILED DESCRIPTION

In some example embodiments, the subject matter disclosed herein relates to configuring a polled reporting mode at the user equipment, so that the user equipment sends, when polled or requested by the network, measurement reports to the network (for example, to allow for handover and/or offloading decisions to a target cell, such as a small cell and the like). In some example embodiments, this polled reporting mode (also referred to herein as prompt reporting mode and requested reporting mode) may be in addition to, or an alternative to, other event-based or periodic reporting modes used for user equipment assisted, network controlled handovers as defined 3GPP TS 36.331 (for radio resource control (RRC) connected modes).

In some example embodiments, the network may configure the polled reporting mode at the user equipment. This may include configuring the user equipment with a measurement configuration including instructions regarding measurements of a certain value, a quantity (for example, reference signal received quality (RSRQ), reference signal, received power (RSRP), and the like), a set of values, or a set of quantities associated with a certain target cell (or cells) on the same or different carrier. Next, the user equipment may proceed to perform the measurements according to the previously configured polled reporting mode. For example, the user equipment may proceed to autonomously perform the configured measurements. In some example embodiments, when the user equipment subsequently receives a request from the network to send a polled measurement report, the user equipment promptly responds by sending to the network the measurement report according to the configured polled reporting mode, without requiring the need for an explicit triggering of a measurement event, such as event A3, A4, A5, and other like reporting events as defined in 3GPP TS 36.331.

In some example embodiments, the measurement report of the target cell may be sent in response to a network request comprising an initial physical downlink control channel (PDCCH) order sent by the network to the user equipment, (which may include a prompt/polling indication), and, in response, the user equipment may send the measurement report of the target cell(s) according to the configuration (for example, the measurement report configuration) in a message to the network. In this example, the network receives the polled measurement report according to the given configuration, when requested by the network, which may be much sooner, when compared to waiting for the user equipment to evaluate whether an event, such as event A3 and the like, has been triggered. This may also enable the network to request from the user equipment a measurement report according to a configuration at points when such a report may be useful from a network point of view (for example, for offloading, load balancing, at call setup, and/or when starting an active data transmission from a state of no active data transmission in connected mode). Moreover, the network may request or poll the user equipment for the measurements and reporting (according to the configuration) of a target cell or cells, rather than waiting for a later measurement event, such as event A3, to be triggered by the user equipment. This polled or requested reporting may, in some example embodiments, allow the network to more quickly access relevant measurements and enable the network to more quickly assess target cells for handovers. This may be used, for example, in the case of heterogeneous networks including small cells on the same carrier or a carrier other than serving cell, and may, in some example embodiments, allow the network to make handover decisions quickly and with less signaling.

In some example embodiments, the network may configure this polled reporting mode and then command the user equipment to deliver, for example, the latest set of configured measurements at the initiation of a specific procedure, such as during an initial call setup, regardless of whether the call setup is user equipment terminated or user equipment originated. For example, the user equipment may be configured to deliver the predetermined measurement, such as the strongest measured neighboring cell on the same or different carrier (or radio access technology). Moreover, this measurement may be delivered to the network early in the call setup phase, without regard to whether events, such as event A1, A2, A3, A4, B1, and the like, are triggered by the user equipment as these reporting events may occur much later after random access, call setup/establishment, and subsequent measurement and evaluation of the events.

Figure 1:
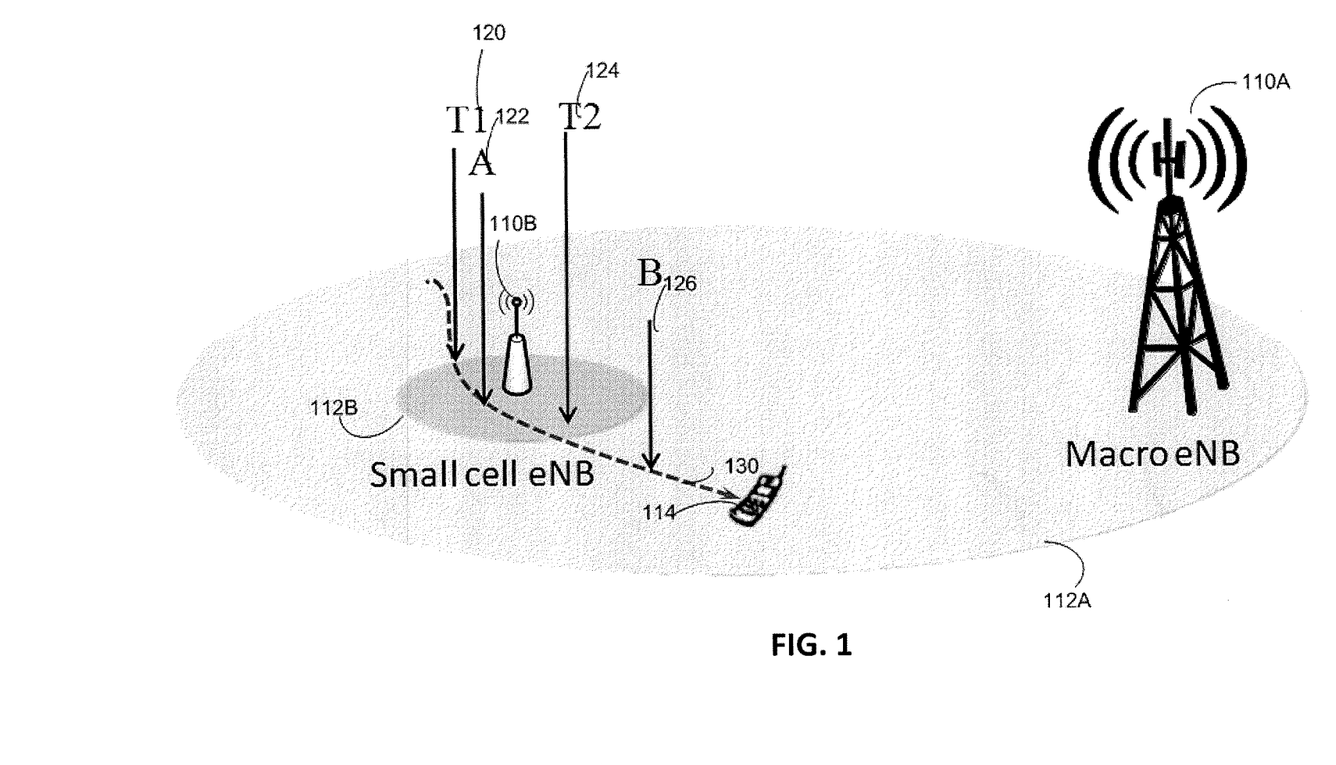
FIG. 1 depicts an example of a system, in accordance with some example embodiments.

Before providing additional examples, the following provides additional description with respect to the example system framework 100 depicted at FIG. 1.

FIG. 1 depicts an example system 100 including a wireless access point, such as for example a evolved Node B base station 110A, serving a macrocell 112A. The system 100 also includes another wireless access point, such as for example a small cell evolved Node B base station 110B, serving a small cell 112B. FIG. 1 also depicts user equipment 114 as it travels along a path 130 including time T1 120. Time T1 120 represents a time when user equipment 114 may detect the cell 112B and the cell 112B is available for reporting, when, or if, polled/requested as disclosed herein. At point A 122, if the user equipment is polled/prompted by the network, the user equipment 114 may send to the network the requested report information, such as RSRP, RSRQ, and the like. At time T2 124, user equipment 114 may no longer be able to detect the small cell eNB 112B, and may thus not be able to provide to the network the measurements such as RSRP, RSRQ, and the like, when requested by the network. When the network requests a report at point B 126, the requested report information would not include information related to small cell 112B.

In some example embodiments, base station 110A may serve a cell, such as for example macrocell 112A, and base station 110B may serve a small cell 112B, such as for example a picocell, a femtocell, a home base station, and the like, although base stations 110A-B may serve other types of cells as well. In other examples the cells (that being either macro cells or small cells) may be co-channel deployed (for example, on the same carrier) or may be co-located (on different carrier but same location). Moreover, the base stations 110A-B may have wired and/or wireless backhaul links to other network nodes, such as for example a mobility management entity, other base stations, a radio network controller, a core network, a serving gateway, and/or the like. The macrocell 112A and small cell 112B may be on the same or different carriers, co-located as well as not co-located. In the case of the same carrier, measurement restrictions, such as for example in Time Domain Division (TDD) enhanced Inter-Cell Interference Coordination (eICIC or further eICIC), may be configured as well.

In some example embodiments, the user equipment 114 may be implemented as a mobile device and/or a stationary device. The user equipment can be referred to as, for example, mobile stations, mobile units, subscriber stations, wireless terminals, tablets, smart phones, a wireless handheld device, a wireless plug-in accessory, or the like. In some example embodiments, the user equipment may include one or more processors, one or more computer-readable storage medium (for example, memory, storage, and/or the like), one or more radio access components (for example, a modem, a transceiver, and/or the like), and/or a user interface.

In some example embodiments, the user equipment 114 may be implemented as multi-mode user devices configured to operate using a plurality of radio access technologies, although a single-mode device may be used as well. For example, user equipment 114 may be configured to operate using a plurality of radio access technologies including one or more of the following: Long Term Evolution (LTE), wireless local area network (WLAN) technology, such as for example 802.11 WiFi and/or the like, Bluetooth, Bluetooth low energy (BT-LE), near field communications (NFC), and any other radio access technologies. Moreover, the user equipment 114 may be configured to have established connections to access points using a plurality of the radio access technologies.

The base stations 110A-B may, in some example embodiments, be implemented as an evolved Node B (eNB) type base station, although other types of radio, access points may be implemented as well such as WLAN or Wi-Fi type of access point. When the evolved Node B (eNB) type base station is used, the base stations, such as for example base stations 110A-B, may be configured in accordance with standards, including the Long Term Evolution (LTE) standards, such as for example 3GPP TS 36.201, Evolved Universal Terrestrial Radio Access (E-UTRA), Long Term Evolution (LTE) physical layer, General description, 3GPP TS 36.211, Evolved Universal Terrestrial Radio Access (E-UTRA), Physical channels and modulation, 3GPP TS 36.212, Evolved Universal Terrestrial Radio Access (E-UTRA), Multiplexing and channel coding, 3GPP TS 36.213, Evolved Universal Terrestrial Radio Access (E-UTRA), Physical layer procedures, 3GPP TS 36.214, Evolved Universal Terrestrial Radio Access (E-UTRA), Physical layer-Measurements Protocol specification, 3GPP TS 36.331, Technical Specification Group Radio Access Network, Evolved Universal Terrestrial Radio Access (E-UTRA), Radio Resource Control (RRC), and any subsequent additions or revisions to these and other 3GPP series of standards (collectively referred to as LTE standards). The base stations 110A-B may also be configured to serve cells using a WLAN technology, such as for example WiFi (for example, the IEEE 802.11 series of standards), as well as any other radio access technology capable of serving a cell.

In some example embodiments, system 100 may include access links. The access links may include a downlink for transmitting to the user equipment 114 and an uplink for transmitting from user equipment 114 to a base station. The downlink may comprise a modulated radio frequency carrying information, such as for example user data, radio resource control (RRC) messages, information configuring a user equipment (for example, configuration of the measurements which are reported when polled by the network as disclosed herein), handover commands, and/or the like, to user equipment 114, and the uplink may comprise a modulated radio frequency carrying information, such as for example user data, RRC messages, user equipment capabilities reporting, measurements, and/or the like, from the user equipment 114 to a base station. The downlinks and uplinks may, in some example embodiments, each represent a radio frequency (RF) signal. The RF signal may, as noted above, carry data, such as for example voice, video, images, Internet Protocol (IP) packets, control information, and any other type of information and/or messages. For example, when LTE is used, the RF signal may use OFDMA. OFDMA is a multi-user version of orthogonal frequency division multiplexing (OFDM). In OFDMA, multiple access is achieved by assigning, to individual users, groups of subcarriers (also referred to as subchannels or tones). The subcarriers are modulated using BPSK (binary phase shift keying), QPSK (quadrature phase shift keying), or QAM (quadrature amplitude modulation), and carry symbols (also referred to as OFDMA symbols) including data coded using a forward error-correction code. The subject matter described herein is not limited to application to OFDMA systems, LTE, LTE-Advanced, or to the noted standards, specifications, and/or technologies.

Although FIG. 1 depicts a specific quantity and configuration of base stations, cells, and user equipment, other quantities and configurations may be implemented as well.

Figure 2:
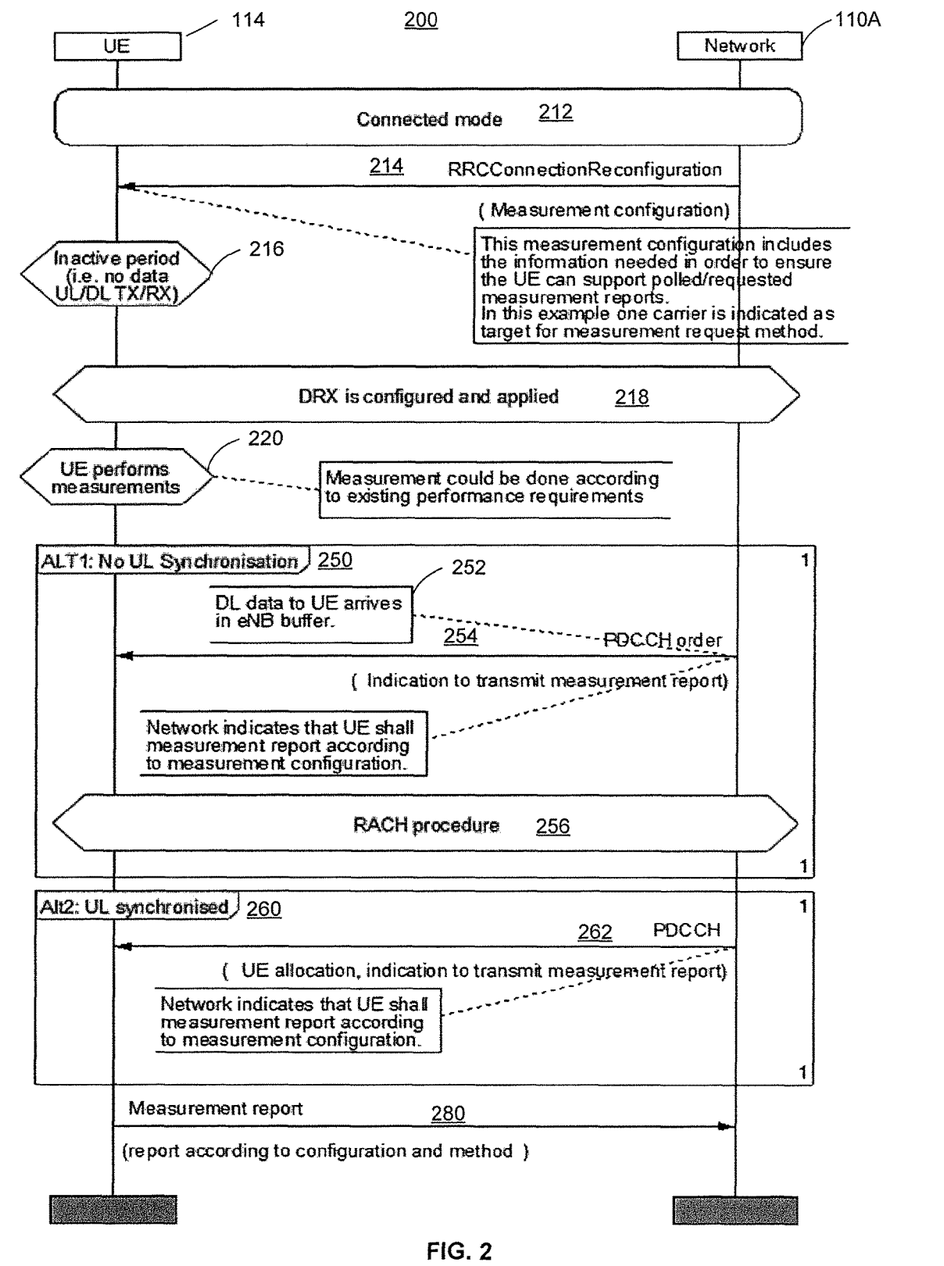
FIG. 2 depicts an example of a process for prompt reporting, in accordance with some example embodiments.

FIG. 2 depicts an example of a process 200 for reporting. The description of FIG. 2 also refers to FIG. 1.

At 212, the user equipment 114 may be in a connected mode. For example, the user equipment 114 may be in a radio resource control (RRC) connected mode. When this is the case, the user equipment 114 may receive, at 214, a message including measurement configuration information (for example, a RRC connection reconfiguration message), in accordance with some example embodiments. The measurement configuration information may include instructions for configuring the user equipment to perform the polled reporting modes (also referred to herein as requested reporting) disclosed herein. For example, the configuration information may, in some example embodiments, indicate that the network supports polled reporting (which may be in addition to, or an alternative to, event-based reporting relying on triggered user equipment events, such as event A3 and the like as noted above), indicate one or more measurements to be performed on a target cell (or cells) on the same or different carrier as user equipment 114, and/or indicate when or how the measurement should be reported to the network. For example, the configuration information may indicate that the receipt of a certain message from the network represents a request for polled reporting of the configured measurement. In some example embodiments, the configuration information may indicate that the receipt of the PDCCH order should be considered a request for the configured measurement, although other messages or information elements may be used as well to trigger a request/poll of the configured measurement reporting to the network. Alternatively, the PDCCH order may itself include an indication that the user equipment should send to the network a polled/requested measurement report as configured with the configuration information.

At 216, the user equipment 114 may experience a period without an active data transmission or reception. For example, the user equipment 114 may include an inactivity timer, and when this inactivity timer elapses, the expiry represents that new data has not been sent on the uplink or received on the downlink for a given period of time. As such, the user equipment 114 may apply, at 218, an RRC connected mode discontinuous reception (DRX). Although the previous example describes the measurements made in DRX mode, the user equipment 114 may also perform the measurements configured at 214 autonomously after receiving the configuration.

At 220, the user equipment 114 may perform one or more measurements, in accordance with some example embodiments. These measurements may, in some example embodiments, be performed while in DRX and may be performed in accordance with the configuration information received at 214, so that the user equipment is ready to provide the measurement when polled. For example, the measurement may comprise measuring one or more neighboring, target cells on a certain carrier as per the configuration provided at 214.

At 250, the user equipment 114 may not be, in some example embodiments, in uplink synchronization (for example, having valid uplink time alignment and the like) with the network, such as base station 110A. As such, when data for the user equipment arrives at the base station 110A at 252, the base station 110A may send at 254 a PDCCH order. The PDCCH order may, in some example embodiments, indicate to the user equipment that the network requests from the user equipment a report of the measurements as configured at 214. The PDCCH order may also initiate a random access (RA) procedure 256 to establish synchronization/alignment. During, or soon after the call setup, the user equipment 114 may send, at 280, the measurement report as requested at 254 and configured at 214. Although the previous example describes data arriving for the user equipment at the base station 110A, the user equipment may initiate the process as well.

At 260, the user equipment 114 may be, in some example embodiments, in uplink synchronization (for example, time alignment and the like) with the network, such as base station 110A. As such, the network may, in some example embodiments, poll the user equipment for the measurement by sending a request directly via the downlink, such as via the PDCCH and the like, to indicate to the user equipment that the network requests from the user equipment a report of the measurements configured at 214. At 280, the user equipment 114 may, in response, send the measurement report as requested at 262 and configured at 214, in accordance with some example embodiments.

In some example embodiments, the process 200 may facilitate fast offloading as the network may poll for (for example, request) a measurement or measurements, such as a measurement report (which may be preconfigured) directly from the user equipment, rather than wait for the user equipment to evaluate event triggers. Alternatively, it could be possible for network to poll/request measurements from different measurement configurations related to different measurement objects.

Although process 200 depicts the measurement request being provided by the PDCCH order at 254 or by other ways as in 262, the network may send a measurement request to the network in other ways as well (for example, via a page message sent to the user equipment 114 or when the inactivity timer is started by the user equipment as described in, for example, TS 36.321).

When the measurement report has been requested or polled by the network (for example, at 254 or 262), the user equipment 114 may report results back to network. In the case that the user equipment has no valid measurement results for the configured setup (for example, no detected cells on a carrier, which has been configured for polled reporting), the user equipment may report an empty measurement report (for example, no results) or report a specific message designed for this purpose. Moreover, the measurement report sent at 280 by the user equipment 114 need not be a full measurement report, and this measurement report may be triggered under certain circumstances, such as when a specific procedure is expected to performed (for example, circuit switch fallback as a result of user equipment terminated or user equipment originated circuit switched call). For example, the network may indicate in the request whether a full measurement or report is needed, and this indication of the request may be carried at for example 254 and/or 262 as noted above. The user equipment 114 may send an indication to the network that a full measurement report is not available but selected radio access technologies and/or carrier measurements are available. In response, the network may choose which kind of measurements (or report) the network would apply or if a (semi-) blind handover or re-direction should be performed. The network may also consider that the indication of report can be made if a certain threshold (for example, quality and the like) has been satisfied. Similarly in a case when offloading to other carriers/cells is desired, the user equipment may, in some example embodiments, indicate during connection setup whether the user equipment has available measurement results from the configured carriers (for example, which has been made within a certain predefined validity time) to allow quick configuration/decisions regarding offloading.

Figure 3:
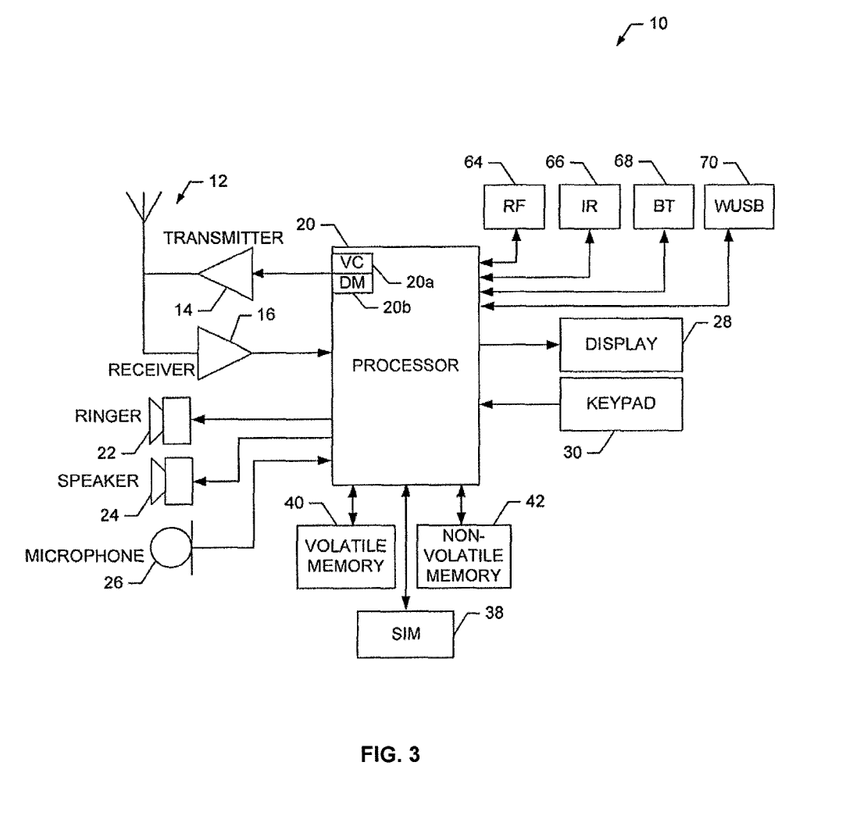
FIG. 3 depicts an example of an apparatus, in accordance with some example embodiments.

FIG. 3 illustrates a block diagram of an apparatus 10 such as, for example, a user equipment, in accordance with some example embodiments. While several features of the apparatus are illustrated and will be hereinafter described for purposes of example, other types of electronic devices, such as for example mobile telephones, mobile computers, portable digital assistants (PDAs), pagers, laptop computers, desktop computers, gaming devices, televisions, routers, home gateways, and other types of electronic systems, may employ one or more of the embodiments disclosed herein.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise processor 20 may be configured to control other elements of apparatus 10 by effecting control signaling via electrical leads connecting processor 20 to the other elements, such as for example a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as for example Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. More particularly, the apparatus 10 may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/ or the like. Also, for example, the apparatus 10 may be capable of operating in accordance with 2.5G wireless communication protocols General Packet Radio Service.

(GPRS), Enhanced Data GSM Environment (EDGE), and/or the like. Further, for example, the apparatus 10 may be capable of operating in accordance with 3G wireless communication protocols, such as for example Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as for example Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as for example LTE Advanced and/or the like as well as similar wireless communication protocols that may be subsequently developed.

Some Narrow-band Advanced Mobile Phone System (NAMPS) and Total Access Communication System (TACS) mobile terminal apparatuses may also benefit from one or more embodiments disclosed herein as should dual or higher mode phone apparatuses, for example, digital/analog or TDMA/CDMA/analog phones. Additionally, apparatus 10 may be capable of operating according to Wi-Fi or Worldwide Interoperability for Microwave Access, WiMAX, protocols.

It is understood that the processor 20 may comprise circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as for example a web browser. The connectivity program may allow the apparatus 10 to transmit and receive web content, such as for example location-based content, according to a protocol, such as for example wireless application protocol, WAP, hypertext transfer protocol, HTTP, and/or the like Apparatus 10 may also comprise a user interface including, for example, an earphone or speaker 24, a ringer 22, a microphone 26, a display 28, a user input interface, and/or the like, which may be operationally coupled to the processor 20. In this regard, the processor 20 may include user interface circuitry configured to control at least some functions of one or more elements of the user interface, such as for example, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as for example a keypad 30, a touch display, a joystick, and/or at least one other input device. In some embodiments including a keypad, the keypad may include numeric 0-9 and related keys, and/or other keys for operating the apparatus 10.

As shown in FIG. 3, apparatus 10 may also include one or more mechanisms for sharing and/or obtaining data. For example, the apparatus 10 may include a short-range radio frequency (RF), transceiver, and/or interrogator 64, so data may be shared with and/or obtained from electronic devices in accordance with RF techniques. The apparatus 10 may include other short-range transceivers, such as for example, for example, an infrared (IR), transceiver 66, a Bluetooth (BT), transceiver 68 operating using Bluetooth wireless technology, a wireless universal serial bus (USB) transceiver 70 and/or the like. The Bluetooth transceiver 68 may be capable of operating according to low power or ultra-low power Bluetooth technology, for example, Wibree, radio standards. In this regard, the apparatus 10 and, in particular, the short-range transceiver may be capable of transmitting data to and/or receiving data from electronic devices within a proximity of the apparatus, such as for example within 10 meters, for example. The apparatus 10 may also be capable of transmitting and/or receiving data from electronic devices according to various wireless networking techniques, including 6LoWpan, Wi-Fi, Wi-Fi low power, WLAN techniques such as for example IEEE 802.11 techniques, IEEE 802.15 techniques, IEEE 802.16 techniques, and/or the like.

The apparatus 10 may comprise memory, such as for example a subscriber identity module (SIM) 38, a removable user identity module (R-UIM), and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, etc., optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing functions of the user equipment/mobile terminal. The memories may comprise an identifier, such as for example an international mobile equipment identification (IMEI) code, capable of uniquely identifying apparatus 10. The functions may include one or more of the operations disclosed herein with respect to the user equipment, such as for example, the functions disclosed at process 200 (for example, disabling the TTT timer and the like). The memories may comprise an identifier, such as for example an international mobile equipment identification (IMEI) code, capable of uniquely identifying apparatus 10.

Without in any way limiting the scope, interpretation, or application of the claims appearing below, a technical effect of one or more of the example embodiments disclosed herein reducing signaling associated with handovers and, in particular, offloads of user equipment to small cells. Another technical effect of one or more of the example embodiments disclosed herein is quicker reporting of measurements to the network by allowing the network to receive measurements of target cells when requested by the network.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any media that can contain, store, communicate, propagate or transport the instructions for use by or in connection with an instruction execution system, apparatus, or device, such as for example a computer, with one example of a computer described and depicted in FIG. 3. A computer-readable medium may comprise a non-transitory computer-readable storage medium that may be any media that can contain or store the instructions for use by or in connection with an instruction execution system, apparatus, or device, such as for example a computer. And, some of the embodiments disclosed herein include computer programs configured to cause methods as disclosed herein (see, for example, process 200 and the like).

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least."

What is claimed:

1. A method comprising:
   receiving, at user equipment, information to configure the user equipment with respect to a polled reporting mode to perform one or more measurements such that the user equipment performs the one or more measurements and is configured to report, when subsequently requested by a network, the one or more measurements, wherein the information comprises instructions regarding the one or more measurements to be associated with a target cell;
   receiving, at the user equipment, a request from the network to report the one or more measurements configured based on the received information and the polled reporting mode; and
   reporting, by the user equipment and on-demand in response to the request from the network, the one or more measurements to the network, without regard to measurement event reporting including one or more user equipment controlled events triggered by the user equipment, and wherein the one or more reported measurements enable the network to assess the target cell.

2. The method of claim 1, wherein the request comprises at least one of a physical downlink control channel order received at the user equipment or an indication received at an initiation of a mobile originated or a mobile terminated call.

3. The method of claim 1 further comprising:
   performing, when the user equipment is in a discontinuous reception mode, the one or more measurements in accordance with the received information to enable the user equipment to provide the one or more measurements, when requested by the network.

4. The method of claim 1, wherein the reporting further comprises:
   reporting, when a call set up establishes synchronization with the network, the one or more measurements to enable at least one of an offloading or a handover to the target cell.

5. An apparatus, comprising:
   at least one processor; and
   at least one memory including computer program code, the at least one memory and the computer program code configured to, with the at least one processor, cause the apparatus to at least:
      receive information to configure the apparatus with respect to a polled reporting mode to perform one or more measurements such that the apparatus performs the one or more measurements and is configured to report, when subsequently requested by a network, the one or more measurements, wherein the information comprises instructions regarding the one or more measurements to be associated with a target cell;
      receive a request from the network to report the one or more measurements configured based on the received information and the polled reporting mode; and
      report on-demand and in response to the request from the network, the one or more measurements to the network, without regard to measurement event reporting including one or more apparatus controlled events triggered by the apparatus, and wherein the one or more reported measurements enable the network to assess the target cell.

6. The apparatus of claim 5, wherein the request comprises at least one of a physical downlink control channel order received at the apparatus or an indication received at an initiation of a mobile originated or a mobile terminated call.

7. The apparatus of claim 5, wherein when the apparatus is in a discontinuous reception mode, the one or more measurements are performed in accordance with the received information to enable the apparatus to provide the one or more measurements, when requested by the network.

8. The apparatus of claim 5, wherein when a call set up establishes synchronization with the network, the one or more measurements are reported to enable at least one of an offloading or a handover to the target cell.

9. A non-transitory computer-readable storage medium including program code which when executed causes operations comprising:
   receiving, at user equipment, information to configure the user equipment with respect to a polled reporting mode to perform one or more measurements such that the user equipment performs the one or more measurements and is configured to report, when subsequently requested by a network, the one or more measurements, wherein the information comprises instructions regarding the one or more measurements to be associated with a target cell;

receiving, at the user equipment, a request from the network to report the one or more measurements configured based on the received information and the polled reporting mode; and reporting, by the user equipment and on-demand in response to the request from the network, the one or more measurements to the network, without regard to measurement event reporting including one or more user equipment controlled events triggered by the user equipment, and wherein the one or more reported measurements enable the network to assess the target cell.

10. The non-transitory computer-readable storage medium of claim 9, wherein the request comprises at least one of a physical downlink control channel order received at the user equipment or an indication received at an initiation of a mobile originated or a mobile terminated call.

11. The non-transitory computer-readable storage medium of claim 9, wherein the program code when executed further causes the operation of:

performing, when the user equipment is in a discontinuous reception mode, the one or more measurements in accordance with the received information to enable the user equipment to provide the one or more measurements, when requested by the network.

12. The non-transitory computer-readable storage medium of claim 9, wherein the program code when executed further causes the operation of:

reporting, when a call set up establishes synchronization with the network, the one or more measurements to enable at least one of an offloading or a handover to the target cell.

\* \* \* \* \*